(12) United States Patent
Appleford et al.

(10) Patent No.: US 11,673,737 B2
(45) Date of Patent: Jun. 13, 2023

(54) DISPENSING CAPSULE AND METHOD AND APPARATUS OF FORMING SAME

(71) Applicant: Varden Process Pty Ltd, South Yarra (AU)

(72) Inventors: Mark Appleford, Clayton (AU); Stuart Gordon, Clayton (AU)

( * ) Notice: Subject to any disclaimer, the term of this patent is extended or adjusted under 35 U.S.C. 154(b) by 130 days.

(21) Appl. No.: 16/351,399

(22) PCT Filed: Aug. 22, 2017

(86) PCT No.: PCT/AU2017/000172
§ 371 (c)(1),
(2) Date: Mar. 12, 2019

(87) PCT Pub. No.: WO2018/049460
PCT Pub. Date: Mar. 22, 2018

(65) Prior Publication Data
US 2020/0231370 A1    Jul. 23, 2020

(30) Foreign Application Priority Data
Sep. 14, 2016 (AU) ................................ 2016903695

(51) Int. Cl.
| D21J 7/00 | (2006.01) |
| B65D 85/804 | (2006.01) |
| A47J 31/40 | (2006.01) |
| B65B 47/10 | (2006.01) |
| D21J 5/00 | (2006.01) |
| B65B 29/02 | (2006.01) |
| A47J 31/36 | (2006.01) |
| B29L 31/00 | (2006.01) |

(52) U.S. Cl.
CPC ........ *B65D 85/8043* (2013.01); *A47J 31/407* (2013.01); *B65B 47/10* (2013.01); *D21J 5/00* (2013.01); *D21J 7/00* (2013.01); *A47J 31/3695* (2013.01); *B29L 2031/7174* (2013.01); *B65B 29/022* (2017.08)

(58) Field of Classification Search
USPC ..................................... 53/560; 162/348, 388
See application file for complete search history.

(56) References Cited

U.S. PATENT DOCUMENTS

| 1,677,905 A | 7/1928 | Salisbury |
| 2,704,493 A | 3/1955 | Randall |
| 3,190,791 A | 6/1965 | Potter |
| 3,802,963 A | 4/1974 | Lee et al. |
| 3,890,195 A * | 6/1975 | Lee .......................... D21F 1/523 162/387 |
| 3,990,940 A * | 11/1976 | Lee .......................... D21F 1/523 162/227 |
| 6,517,684 B1 * | 2/2003 | Juul .......................... D21J 7/00 162/228 |
| 8,062,477 B2 | 11/2011 | Appleford et al. |
| 2003/0136537 A1 * | 7/2003 | Frederiksen ............. D21J 7/00 162/410 |
| 2003/0210606 A1 | 11/2003 | Chase et al. |
| 2014/0272018 A1 | 9/2014 | Koller et al. |
| 2015/0204020 A1 | 7/2015 | Gordon et al. |

FOREIGN PATENT DOCUMENTS

| WO | 2016079701 A1 | 5/2016 |
| WO | 2018049460 A1 | 3/2018 |

OTHER PUBLICATIONS

Supplementary European Search Report dated Apr. 28, 2020 in European Application No. 17849908.3.
EPO Notice of Intention to Grant, Appl. No. 17849908.3-1016, dated Jan. 27, 2021 Applicant Varden Process Pty Ltd.
Written Opinion of the International Searching Authority, PCT/AU2017/000172, dated Nov. 13, 2017.
International Search Report, PCT/AU2017/000172, dated Nov. 13, 2017.
Brazilian Patent Office Official Report, "Office Action for PCT AU2017-000172" for Mark Appleford et al., dated Aug. 22, 2017, pp. 1-4.

* cited by examiner

*Primary Examiner* — Mark Halpern
(74) *Attorney, Agent, or Firm* — Nwamu, PC (57) ABSTRACT

An apparatus for high speed continuous thermoforming of pulp materials into pulp based products including a beverage dispensing capsule comprising a body having a side wall and a base formed entirely of moulded pulp fibres, said apparatus comprising a holding tank for water and pulp fibres in suspension, a continuous feed belt of articulated mesh toolsets contoured to the preform shape of said products, said belt being inclined to allow partial immersion and partial withdrawal from said suspension by continuous rotation of said belt, vacuum means applied to said mesh toolsets to draw said pulp fibres onto said mesh toolsets immersed in said suspension to form a preform pulp mat of said product.

7 Claims, 9 Drawing Sheets

DISPENSING CAPSULE AND METHOD AND APPARATUS OF FORMING SAME

This application is a 371 of PCT/AU2017/000172 filed 22 August 2017.

CROSS REFERENCE TO RELATED APPLICATIONS

The present invention references U.S. Pat. No. 8,062,477 B2 which is incorporated herein by reference.

FIELD OF THE INVENTION

The present invention relates to products, methods and apparatus for using plant-fibre to produce an improved capsule, which is adapted to house ground beverage and brewable products including coffee. One example of such a capsule can be shaped so as to fit within a capsule fed coffee machine. The capsule fed coffee machine and the coffee capsule are designed to work in unison, with the capsule's functions being to hold the correct volume or aliquot of coffee, to act as a filter, and to contain the spent coffee grains. The capsules are typically designed to provide enough coffee for a single serve and this in turn requires a proportionally high amount of packaging material per single serve. The capsules are designed to preserve the flavour of the coffee, which can be deleteriously effected by oxygen. The capsules are designed to provide convenience and to simplify the process of brewing a quality coffee beverage at home with consistency and ease.

BACKGROUND OF THE INVENTION

Prevailing capsule technology typically uses plastics or aluminium to form this packaging, which limits recycling. Plastic and aluminium are most commonly used as they are easily manufactured, relatively inexpensive and capable of creating a good barrier to oxygen to preserve the taste of the coffee.

The invention will be further described herein with specific reference to capsules and methods of production and apparatus adapted for use with coffee. However, it is understood that the invention is not limited to coffee capsules and extends to a range of beverage capsules and other mass produced products formed from pulp.

The capsule contains the coffee and is designed such that when inserted into the coffee machine the capsule is pierced both top and bottom. When pierced, the capsule can then be injected with pressurized hot water from the top, and the brewed coffee can flow out from the bottom.

Coffee capsules or 'coffee pods' are a disposable product that are single use and typically single serve. The consumer benefit to coffee capsules is that they manage the amount of coffee in each serve as a pre measured aliquot and that the waste coffee grounds are retained within the capsule and can be easily disposed of without requiring the machine to be cleaned. The negative aspect of the capsule is that coffee waste and the capsule material are typically not recycled. The low level of recycling is due to the mixed materials involved as the recycling process requires that these materials be separated prior to the materials being suitable for recycling. The materials currently used for the capsules vary but the most widely used capsules are produced from aluminium. The aluminium capsule is typically formed from a disc of aluminium which is impact moulded into a capsule body form. The closure or lid on the capsule is also formed from aluminium with the parts being clinched together to seal the capsule. Alternatively, the capsules can be formed from plastic and there are also capsules formed from bio-plastic or bio-polymer material, which will decompose at an accelerated rate. There are challenges to the use of bio-plastic notwithstanding that it has the same visual appearance as standard plastic and so requires labelling to convey its nature. Bio-plastics are also criticised for being difficult to recycle and contaminating the recycling streams of standard plastics. There are also limitations in the processes required to make bio-plastic in that they lack the performance of standard plastics and that in 'whole of life' analysis they are not sustainable due to the resources required during production.

It would be desirable to provide an alternative to these current capsule formats that offered all of the consumer benefits but without the challenges of managing recycling caused by the use of finite materials such as petrochemical polymers and aluminium, and without the consumer challenge of disposing of these resource rich products into the mainstream waste system. It would also be highly desirable to produce a capsule format that could be readily identified by the consumer as a differentiated solution that offered all of the benefits of current capsule products with none of the negative issues. The ability to identify the new capsule product of the invention would require that the material be recognisable as different to the plastic and aluminium capsules currently in the marketplace. In addition, the product of the invention could be readily decorated, using the Varden decoration process detailed in U.S. Pat. No. 8,062,477.

The production processes used in the forming of aluminium and plastic capsules is highly evolved and the line speed is sufficient to deliver hundreds of millions of these capsules annually. These processes are, however, unsuitable for pulp fibre based products. The current invention allows for an improved capsule product and high volume production methodology and process which can shape any fibre, and in particular sustainable and re-cycleable plant-based fibre, into the prerequisite shape, at a similar speed to allow it to be as economically viable as existing solutions. The resultant capsule will then have the necessary physical attributes to allow it to be used in place of an existing aluminium or plastic capsule without any degradation in performance, but with the added benefit of increased sustainability. The existing aluminium or plastic capsules have a frusto-conical shape. The depth and steepness of the shape, typically referred to as the draw and draft angle, and shown in FIG. 1C, do not allow the shape to be deformed from a flat mat of pulp fibre as described in PCT/AU2013/000853 (WO/2014/019027) and US 2015/0204020. The process detailed in PCT/AU2013/000853 is for a high speed pulp moulding process that can generate a range of shapes deformed from a flat mat of pulp and that these can then be subsequently decorated and deformed into finished pulp fibre products. The range of these shapes is limited to those with a shallow depth relative to the draft angle. Increasing the verticality of the draft angle reduces the depth that can be achieved. Exceeding these limits results in the walls of the pulp product first thinning and then separating as the inelastic nature of the fibre prevents them from stretching, which makes this previously disclosed process unsuitable for producing capsules of the type described herein.

Equally, existing pulp forming technologies are too slow and expensive to produce the frusto-conical shape of the capsule at speed and volume, and therefore economically. It is also desirable that the new capsule product of the invention would be capable of being manufactured at high speed such that the new capsule product of the invention could be delivered in volumes sufficient to impact and satisfy the current market and at a low cost.

For the pulp fibre capsule to be usable within the existing range of coffee machines it is necessary that the pulp fibre capsule maintain similar dimensions to those of both aluminium and plastic coffee capsules. These dimensions are shown in FIG. 1c. Moreover the new pulp based capsule product of the invention is adapted to specifically conform to the existing product and performance profiles of existing plastic and aluminium capsules thereby allowing the capsules of the invention to fully function in existing machines. In particular, the pulp based capsules of the invention are adapted to precisely fit into existing machines, receive piercing apparatus of existing machines, withstand application of heated pressured water, eject brewed beverage from the machine and withstand ejection from the machine without failure.

In order to provide a pulp fibre capsule of suitable specifications to function as a substitute for existing aluminium or plastic coffee capsules an entirely different manufacturing approach is required that conforms the pulp fibre to these dimensions, in a high speed process thereby overcoming the limitations of prior art.

The above references to and descriptions of prior proposals or products are not intended to be, and are not to be construed as, statements or admissions of common general knowledge in the art in Australia.

SUMMARY OF THE INVENTION

In a first aspect the invention provides a dispensing capsule for an aliquot of ground brewable beverage said capsule being formed of moulded pulp fibres.

The capsule may comprise a body having a side wall and a base formed entirely of moulded pulp fibres where the side wall and base of said body are formed as a one piece integral construct, and a lid fixable to said body for sealing said capsule.

The capsule lid may be formed primarily of moulded pulp fibres. The capsule body may include a frusto-conical shaped side and a base formed integral therewith. The capsule side wall may include longitudinal ribs of higher density pulp.

In another or second aspect the invention provides a process for manufacture of a capsule as previously described, said process including the following steps:
a) providing a continuous feed belt of a plurality of articulated mesh tool sets contoured to a preform of the said capsule shape and adapted to be drawn through a tank of water and pulp fibres in suspension without interruption.
b) inclining said belt to allow continuous partial immersion and partial withdrawal of said belt from said suspension.
c) applying a vacuum to said continuously moving or fed tool set so as to draw said pulp fibres onto said plurality of mesh tool sets immersed in said suspension to form a preform mat.

The capsule of the first aspect may be formed by a process according to this second aspect.

The process as previously described wherein said tool set is contoured to include a pulp fibre mat that has a plurality of said preform capsules.

The contour may be the female or male preform profile of said capsules.

The process may further include the step of providing a moving tool set adapted to lift sections of said preformed mat from said continuously moving belt.

The tool set may include a male or female profile of said preform capsule and is adapted to engage with what will become the interior or exterior of said capsule.

The process may further include the use of secondary tooling to deform the pulp fibre into the final pulp fibre part that will become either the body of the capsule or the lid.

The process may further include the multiple steps of applying heat and pressure to the preformed mat to dry or partially dry the pulp and to define the final dimensions and configuration of said capsule part. This may be done in one process or in multiple separate processes wherein the pressure and deformation happens in one stage without the application of heat, whilst the heat and drying is applied at a separate stage, the separate stage potentially having the capacity to apply pressure.

The part may be the body of the capsule or the lid of the capsule. The lid of the capsule may also be formed from a high-speed flat belt feed pulp process as detailed in PCT/AU2013/000853.

The process of forming the preform mat of pulp fibre may further include the ability to draw specific quantities of pulp fibre onto the contoured mesh belt such that the pulp mat has areas of differential density.

In another or third aspect the invention provides an apparatus for high speed continuous thermoforming of pulp fibre materials into pulp fibre based products comprising a holding tank for water and pulp fibres in suspension, a continuous feed belt of articulated mesh toolsets contoured to the shape of said products, said belt being inclined to allow partial immersion and partial withdrawal from said suspension by continuous rotation of said belt, vacuum means applied to said belt to draw said pulp fibres onto said mesh toolsets immersed in said suspension to form a preform pulp mat of said product.

The capsule of the first aspect may be formed using an apparatus according to this third aspect.

In the apparatus of the third aspect said mesh toolset contour may represent the female or male profile for a preform of said product.

The apparatus may include a continuously moving tool set adapted to lift sections of said fibre preform from said continuously moving articulated mesh tool set.

The apparatus as previously described may have said subsequent tool set of a male or female profile of said product and adapted to engage with what will become the interior or exterior of said product.

The apparatus as previously described may produce the product being a coffee capsule and/or lid.

BRIEF DESCRIPTION OF THE DRAWINGS

The invention will now be described with reference to preferred embodiments and FIGS. 1 to 9 with accompanying legend, by way of example only, and is not to be taken as limited to the preferred embodiment. A brief description of the Figures is.

LEGEND

1 Lid for capsule
2 Flange on capsule
3 Piercing Area
4 Piercing Channel
5 Preform shape and thickness
6 Final Form shape
7 Planar area for decoration
8 Articulated mesh toolsets
9 Secondary forming toolset
10 Transfer toolset
11 Suction area on belt return
12 Suction area on belt rise
13 Non-suction area on belt for transfer
14 Articulation point between mesh toolsets

DETAILED DESCRIPTION OF THE PREFERRED EMBODIMENTS

The Capsule

Figure 1:
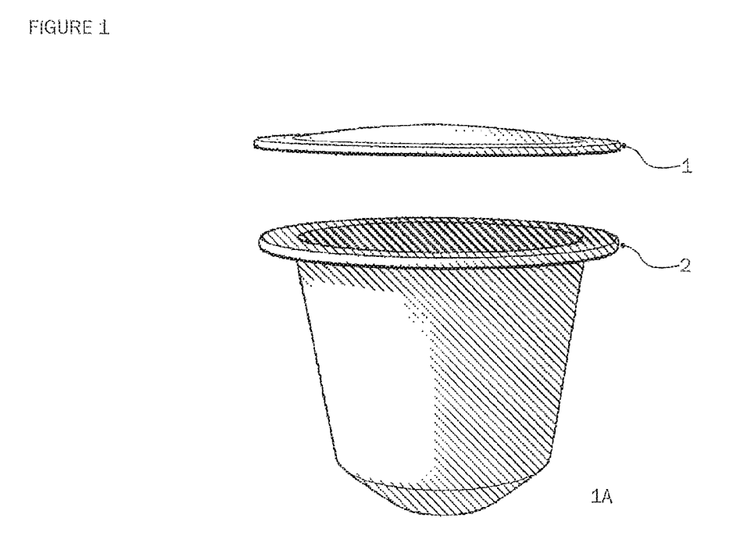
FIGS. 1A, 1B and 1C show the capsule and lid.
Figure 2:
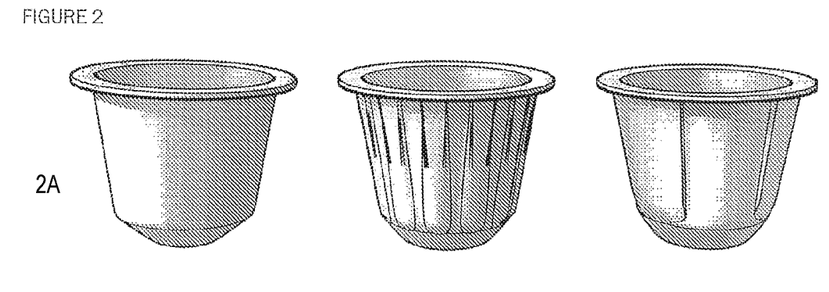
FIGS. 2A to 2D show wall thickness variations of the capsule body.
Figure 3:
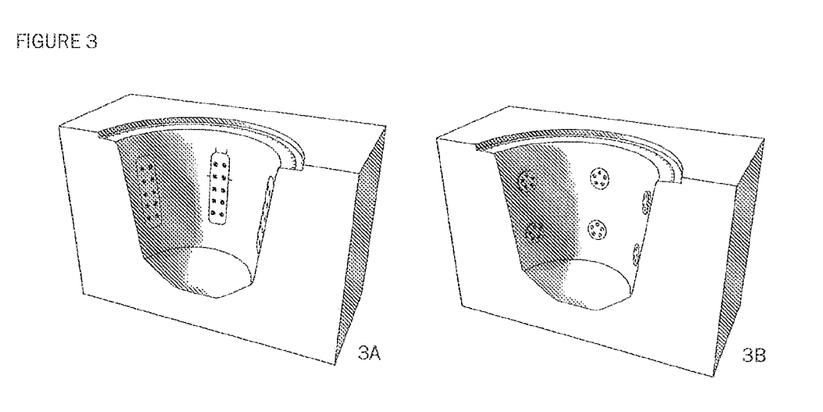
FIGS. 3A and 3B show how specific vents are used within the formation of the capsule.

The capsule will now be described with reference to FIGS. 1, 2 and 3.

The invention provides a cartridge or capsule product made from moulded fibre source(s), which provides the same or improved properties to existing capsules and is capable of being configured to conform to existing plastic and aluminium product and performance profiles.

The primary material used in the capsule of the invention is pulp fibre. Pulp fibre products are currently formed from a number of fibre sources which include tree fibre, bagasse (sugar cane) fibre, palm fibre and hemp fibre. The fibres required for the process exist in a vast number of plant sources and a large number of these are in large-scale commercial production.

The pulp coffee capsules can be designed such that they are both dimensionally compatible and process compatible with existing coffee capsule systems. This would enable the pulp coffee capsules to be readily used by consumers in existing machines without the need to alter the dispensing systems or any other aspect of the existing machines. This is shown in FIG. 1A, being the capsule with lid, and in FIGS. 1B and 1C being different views of the same capsule.

The pulp coffee capsules of the invention can be manufactured to the requisite tolerance such that their dimensions are within the tolerance of the dispensing systems. This is shown in FIG. 1C. The pulp coffee capsules also have to provide sufficient internal volume within the capsule to contain a similar volume of coffee grains as existing coffee capsules thereby ensuring that there is no impairment to coffee taste or strength. The wall thickness requirement necessitates that the wall thickness of the pulp coffee capsule is consistent from one coffee capsule to the next and also that the wall thickness is within the tolerance of existing coffee capsule technology. Aluminium capsules have a wall thickness of approximately 100 microns and injected moulded plastic coffee capsules have a wall thickness of between 600 to 800 micron. Pulp moulded coffee capsule wall thickness can be designed such that the wall thickness can be varied to allow for areas of increased strength and the coffee capsule can be designed such that range in wall thickness can be between 500 to 900 micron. This range of thickness can be averaged across the capsule to ensure that there is no decrease in the internal volume such that it would become less than that of an injection moulded plastic coffee capsule.

The ability to alter the wall thickness through the design of the final mouldsets (as opposed to the pre-form mouldsets) provides an additional benefit in that the density of the wall can also be varied. The creation of these variations provides the ability to locally strengthen the coffee capsule to improve performance. This is shown in FIGS. 2A and 2B and 2C.

In addition to the differential thickness created within the mould, the density of different areas of the capsule can be controlled, and altered to best align with the function of the pod or capsule in use. In particular, the use of custom-shaped steam extraction vents allows for denser areas of pulp where the vertical ribs are, so that structural integrity is maintained during the brewing and coffee extraction phase, as shown in FIG. 3A. The creation of custom shaped and specifically located steam extraction vents is shown in FIG. 3B, and this is a departure from standard pulp thermoforming, where standard, uniform steam extraction vents are used with little or no regard to the product's end use. A further embodiment of this invention is the capability to avoid the placement of steam extraction venting in those areas of the mould that create a part of the capsule that will eventually be pierced by the extraction apparatus.

Closure

The closure for the coffee capsule can be sourced from an existing process, such as metal foil laminated to plastic film or can also be produced from pulp fibre with the option to laminate a bio-plastic film to the fibre to improve barrier properties and aid in bonding to the pulp capsule. The benefit of said closure being produced from pulp fibre is that it does not introduce another material to the product, and therefore the process of recycling or composting of said pulp fibre product is kept simple. The process of the invention would enable the matching of a pulp-formed body with a pulp formed closure or lid. The pulp formed lid would use the same combination of variable density areas as does the body, to ensure precise performance. The lid is shown in FIG. 1A (1). The lid needs to be rigid enough not to collapse during the piercing process, but also thin enough to allow piercing and the egress of hot liquid without the loss of fibre into the liquid, which would contaminate the drink. This is done by creating thinner more densely compacted areas where the piercings will occur, and ribbed and reinforced areas elsewhere. In one embodiment of the invention this is done as described herein by the marrying of different male and female moulds and the location of the steam extraction vents in specific area and shapes so that the areas of variable density are formed. Steam extraction vents are not placed in the area where the piercing will occur, instead a smooth male and female mould ensures a smooth finish on both the interior and exterior surfaces and minimal possibility of any fibre contamination of the liquid during the brewing process.

The sealing of the closure onto the pulp fibre body of the coffee capsule can be achieved by a number of methods, such as:—
  use of starch based adhesive that will bond the pulp fibres
  use of a cold seal adhesive which would be applied onto the contact areas of both surfaces and is then bonded through self-contact (as is used in flow wrap packaging for confectionery etc
  use of a plastic laminated to the pulp closure which can be used to heat seal the closure to the body of the coffee capsule. The laminate can be applied specifically to the contact areas and the plastic laminate can be produced from a bio-polymer.

use of a mechanical bond between the fibres which could also supplement the bonding of the previously listed methods.

The pulp capsules of the invention therefore fulfil all the criteria to fully function in existing machines including fitting into existing machines, receiving the piercing mechanisms of existing machines, withstanding application of heated water under pressure to brew and extract ground beverage within the capsule and allow egress or ejection of the capsule from the machine without failure or disintegration. The pulp capsules also withstand prolonged storage in the machine after use without swelling or jamming.

Pulp Mat and Pre Form

Figure 5:
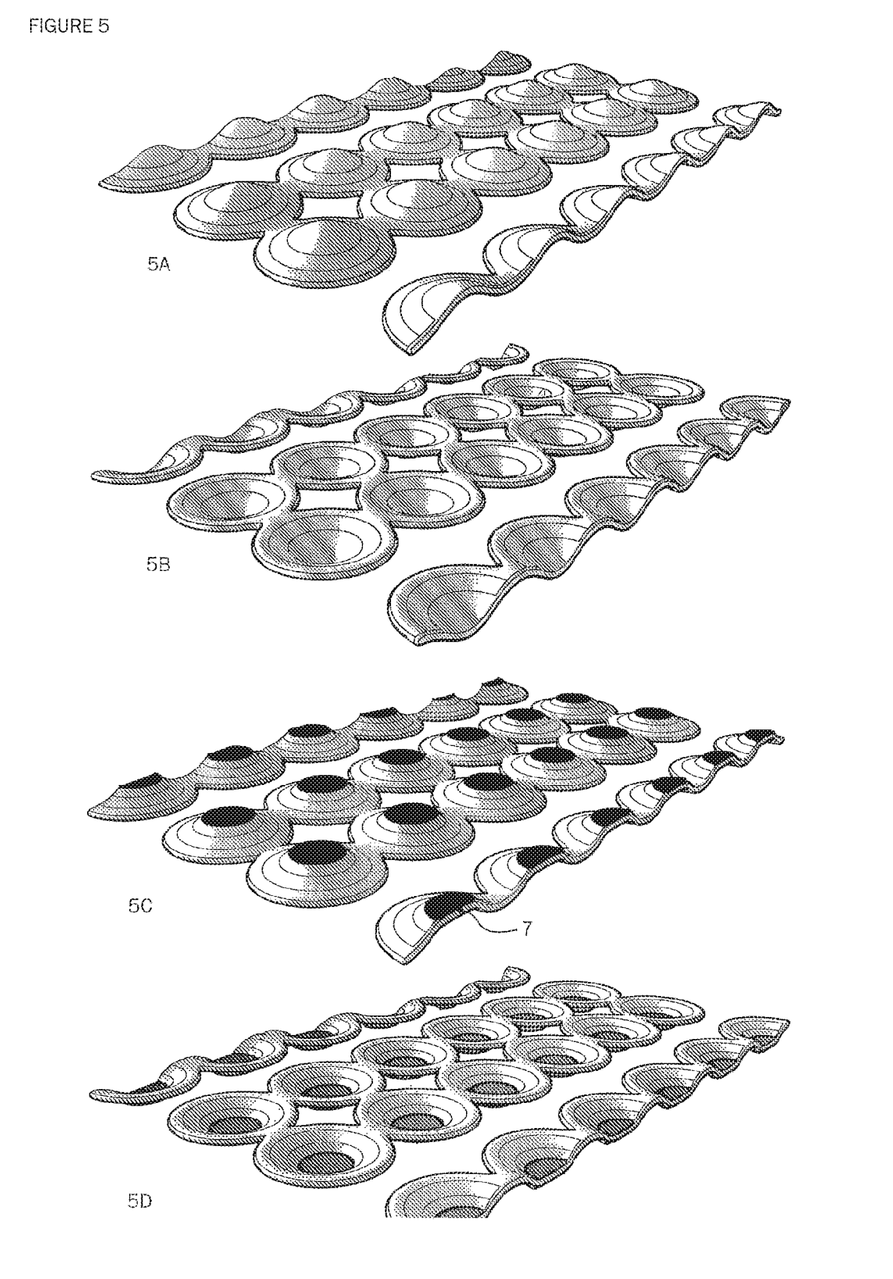
FIGS. 5A to 5D show the pulp forming mat.

FIGS. 5A and 5B show one iteration of the contoured pre-form pulp mat section (above and below) created by the articulated contoured mesh toolset. This mesh toolset is not created with any flat sections and therefore the pulp mat would not be suitable for pre-deformation printing as detailed in U.S. Pat. No. 8,062,477 B2, without the use of a specific secondary toolset to create said planar surfaces.

The contoured mat is further deformed while wet into the array of capsules. These capsules can then be trimmed to individual units to be filled and capped individually or filled and capped in sections and then trimmed to single units.

FIGS. 5C and 5D show one iteration of the contoured pre-form pulp mat section (above and below) created by the contoured mesh toolset. This mesh is created with flat sections, shown in black and indicated by the number (7), and therefore this pulp mat would be suitable for pre-deformation printing as detailed in U.S. Pat. No. 8,062,477 B2.

Piercing

Existing capsule technology uses aluminium and plastic as the capsule material. The process of piercing the capsule requires that the capsule material is sufficiently hard such that the material is pierced and does not simply deform and become displaced by the piercing tool within the coffee machine. The grade of aluminium used and the process by which it is deformed into the final capsule shape provide sufficient hardness and rigidity to allow for piercing. The material for plastic coffee capsules is selected such that it possesses the correct properties. The design of the plastic capsules also ensures that the plastic does not deform away from the piercing heads.

The process of the invention provides a pulp fibre capsule to be pierced in the same manner as both an aluminium and plastic coffee capsule, and with the same existing machinery. The pulp fibre capsule requires sufficient compressive strength to resist deformation and wall thickness thin enough to be pierced. The material properties of the pulp fibre are also important as the fibres need to be resistant to absorbing moisture as this would reduce the compressive strength of the fibre allowing it to be more readily deformed and thereby allowing it to move away from the piercing heads. Prior art additives for fibre can increase the moisture resistance of the fibre and there are a number of these which are also sustainable and compostable.

The pulp fibre capsule can also be designed such that the area of piercing has improved performance. This improvement can be delivered by methods such as having areas with increased fibre compression and also a thinner wall section. This is shown in FIG. 2D (3). This could also be designed to provide a guiding channel for the piercing head to improve engagement at the point of contact. This is shown in FIG. 2D (4). The channel could also be designed such that the piecing head structure supports the channel wall during the piercing process and thereby improves the capsule's ability to resist deformation during the piercing process.

One preferred embodiment of the process of the invention would have an internal biopolymer liner to improve the barrier properties of the capsule. The use of such an internal biopolymer could provide additional benefits in the area of piercing. Current coffee capsules made from aluminium have an additional material added at the area of piercing, which appears to aid in securing the pierced aluminium and preventing small particles of aluminium entering the coffee product. In one preferred embodiment of the process of the invention the internal biopolymer liner would bond to the pulp fibre and reduce the likelihood of pulp fibres entering the coffee product.

Prior Art within Existing Machines

Current coffee capsules are typically designed such that after the coffee extraction cycle is complete the capsule can be ejected into a collection tray. The method of removing the capsule from the system and allowing it to drop into the collection tray is typically achieved by using the wider flange area of the capsule, this is shown in FIG. 1A (2). During insertion the capsule is placed into the open machine such that the flange is held within a partially enclosing ring fitment. The capsule is held such that it is orientated to allow it to be pushed into a cavity within the main body of the machine. The capsule body and capsule lid are typically pierced during the process of closing the machine. Upon completion of the coffee making process the capsule is drawn out from the cavity. The process of drawing the capsule from the cavity is typically done by the use of lugs which engage with the underside of the capsule flange. The use of these lugs on a small area of the capsule flange applies a relatively high pressure on the flange. The existing plastic and aluminium capsules have been engineered to withstand this pressure and provide a smooth consistent egress. The invention provides the moulded fibre capsule with sufficient rigidity to allow the capsule to be withdrawn by said lugs pulling on said flange and being ejected into the collection tray.

The commercial systems that are designed specifically around the aluminium coffee capsules are constructed for use with proprietary capsules only. This presents unique challenges to the use of fibre pulp for the capsule, as pulp material has different physical properties to either aluminium or plastic. By necessity the shape of the pulp capsule has to be within a narrow dimensional envelope to allow it to be used within existing machines and in the same manner as existing proprietary capsules.

The machine is designed such that it requires the capsule to be within the dimension envelope during the loading of the capsule, the brewing of the coffee or beverage aliquot, the drawing of the capsule from the brewing cavity and finally in the egress stage, where the capsule is typically ejected into a collection tray. These stages, and the implications for capsule design, are further detailed below:

the loading of the capsule requires that the capsule profile can be inserted through an opening in the machine     the capsule flange is captured by internal runners which are dimensioned such that they will only tolerate a narrow range of flange dimensions     the runners are used to alter the angle of the capsule such that it is offered up to the brewing cavity at a specific angle     the change in angle of the capsule requires the capsule to rotate through an arc, the internal space is designed such that if the capsule is longer than the proprietary capsule it will not clear the internal surface of the machine and the capsule will jam the cavity space is design to accept a limited variation in dimension the cavity includes a number of blades which are positioned such that they pierce the capsule and these blades are dimensioned such that they will not pierce the capsule if it outside of tolerance after 'brewing' the capsule is drawn from the cavity by an adjacent set of smaller runners, these smaller runners or lugs apply force to the flange of the capsule when the operator opens the system. The lugs exert a focused pressure on the flange. If the flange is bent, torn or otherwise deformed during this process then the capsule may remain in the machine or fail to egress properly once the 'lugs' pull the capsule clear of the cavity, it drops with gravity into the collection tray. During this process the capsule has to drop through a purposefully narrow gap which further restricts the dimensional tolerance of said capsule.

The pulp capsules of the invention fully comply and function within the above stages of operation.

Process

The process of the invention will now be described.

In this embodiment the invention relates to the high speed forming and decoration of thermoformed pulp fibre material into single serve ground coffee capsules for use in dedicated brewing machines.

Current methods of pulp fibre thermoforming create a pulp fibre product by drawing water through a mesh screen by the use of a vacuum. The mesh screen performs as a mould and is lowered into a tank of water and pulp fibres in suspension. The pulp fibres are pulled onto the mesh screen mould by a vacuum process. The fibres amass on the screen until they create a mat of fibres. The screen mesh can be shaped as either the male or female tool to the male or female product and so the mat conforms to the shape of the final product. The mesh is lifted out of the tank. The mat is then dried into its final form by the application of heat and pressure. This is typically done on a separate station of the machine and with different tooling, non-mesh or a with a mesh tool used for the interior surface and polished tool for the exterior face so as to provide a more aesthetically pleasing finish on the exterior face of the product. The pressure also sets the density and wall thickness of the finished part. The speed and productivity of this process is driven by platen size and dwell time, making it too slow and costly for the production of said capsule where low production cost and precise production dimensions are both required.

Other aspects of the overall process are similar to the process cited in prior art, namely the water extracted from the mesh tool is typically recirculated so as to reduce water consumption. A measurement system controls the flow of liquid from the reserve tank to the main tank to maintain the correct fibre to liquid ratio. The process of continuous replenishment is consistent with currently available systems and is not novel to our process.

Figure 4:
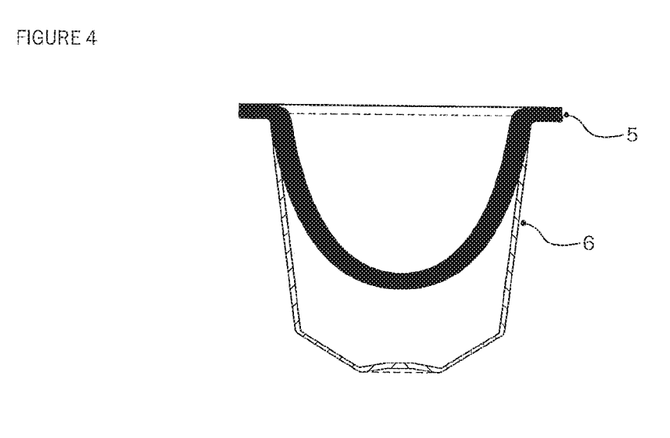
FIG. 4 shows the preform shape and final capsule in profile.

For this invention the depth of draw, the draft angles of the capsule and the production speed required would preclude the use of conventional processes, and conventional apparatus. The capsules themselves are typically 26 mm deep, shown in FIG. 1C with the depth of the capsule being similar to the upper diameter of the capsule and with a steep draft angle in the region of 97.2 degrees off horizontal. The depth of the part and the severity of the draft angle means that the shape is difficult to make using a conventional single mould pulp process as well as being slow and uneconomic as previously discussed. Furthermore, said capsules are impossible to make using the flat mat deformation process defined in PCT/AU2013/000853 due to the non-elastic nature of pulp fibre and the physical limitations of pulp fibre as described earlier. The unique shape of said capsule can optimally be obtained in pulp fibre with the initial creation of a preform shape, The term "preform" is herein to be understood to mean an intermediate form substantially conforming to the shape of the capsule. The specific preform shape is rounded in profile, as shown in FIG. 4, which allows for a greater level of control over the amount of fibres amassed thereon, and of a sufficient depth and draft angle to allow the fibres amassed thereon to be drawn into the final shape whilst maintaining a consistent finished wall thickness and density. Furthermore, this rounded preform shape is uniquely suited to the continuous and inclined nature of the forming process of the invention.

The conventional process would be further challenged in attempting to manufacture a dimensionally consistent pulp fibre part, which is a critical aspect, given the need for the pulp fibre capsule to be used within existing coffee systems and for the internal volume of the capsule to be consistent to existing technologies without any modification or alteration to the specification of existing machines. In addition, the volume must remain within a consistent tolerance such that the volume of coffee does not vary beyond an acceptable scope as this could adversely affect the taste and also create production challenges were the process to use volumetric filling as this would fill each capsule, regardless of internal capacity, with the same amount of coffee, which could result in over-filling which would contaminate the production line and the sealing area of the capsule body. Contamination of the sealing area could result in a poor seal and thereby a poor oxygen barrier.

Figure 6:
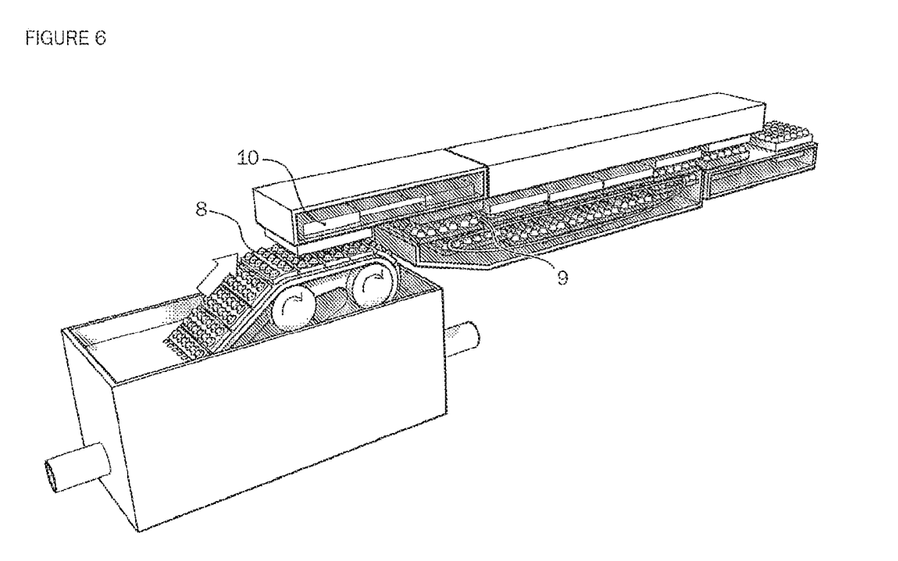
FIG. 6 shows an apparatus for manufacture of the capsule.

The invention overcomes these challenges through the use of a two-stage or multiple stage pulp thermoforming process where the continuous fibre mat is a partially shaped version of the final shape (a preform), supplied by means of a continuous belt of mesh toolsets. This is shown in FIG. 6. The first toolset, which is mesh, creates a shape where fibre is amassed such that the fibre is capable of being redistributed into elements of the final shape, and adequate pulp fibre is placed into crucial areas for further deformation, and concentration so as to fit within a practical distortion envelope. The process also allows for the creation of flat planar areas that can take pre-distorted decoration as described in U.S. Pat. No. 8,062,477 B2. The subsequent toolsets shown in FIG. 6(9), then create the final shape and the final density of pulp fibre in the appropriate areas. The number of subsequent toolsets would be determined by the degree to which the subsequent actions of forming are combined or separated. In a preferred embodiment of the invention there would be a secondary and tertiary toolset. The second toolset would deform the pulp fibre under pressure with the third toolset applying heat to dry the product. The third toolset can also apply pressure to both accelerate drying and also to further define the product shape. The toolsets can be finished to provide texture, or be polished so as to provide the pulp fibre with a smooth finish. The application of texture to the exterior of the capsule could be preferable in that it could visibly differentiate the pulp capsule from existing capsule products. The interior capsule could be highly polished so as to present a more resilient and smoother surface for easier filling of the coffee grains. The smooth interior finish would also reduce the likelihood of the pulp fibres interacting with the coffee grains.

During the drying process steam is created and this steam needs to be drawn from the tool. There are numerous methods for this in the traditional thermoforming process and these can include the male tool being mesh so as to allow the steam to escape or specific vent holes can be placed within either one or both of the tools. The traditional process for steam removal is a general process that can be applied to most pulp products but is not tailored to that individual product. For this invention the placement of the vent holes can be specific to the production of coffee capsules and therefore the position can be optimised. This is done with the use of shaped steam extraction vents. These are shown in FIG. 3A. These align with the ribbed areas on the exterior of the capsule so as to create denser and stronger areas that resist compression, and so in turn allow for the successful piercing of the top and bottom of the capsule during the brewing process. In addition the use of said specific custom steam extraction vents can speed the process of steam extraction, further reducing cycle time and reducing production cost. In addition, the process of the invention allows the production of a capsule having sufficient dimensional tolerances to allow reliable capsule egress from the machine after use.

Apparatus

Figure 7:
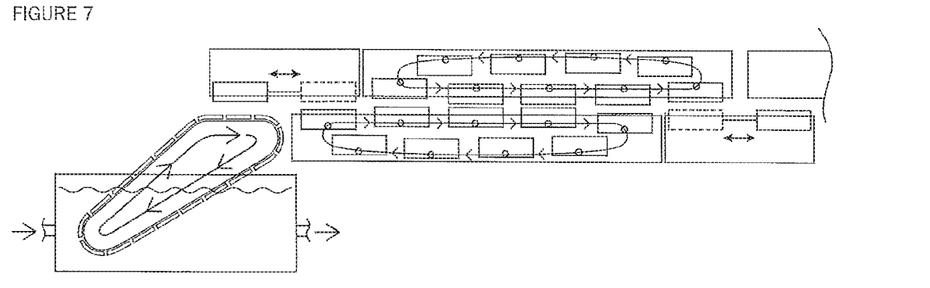
FIG. 7 shows a schematic representation of the apparatus.
Figure 9:
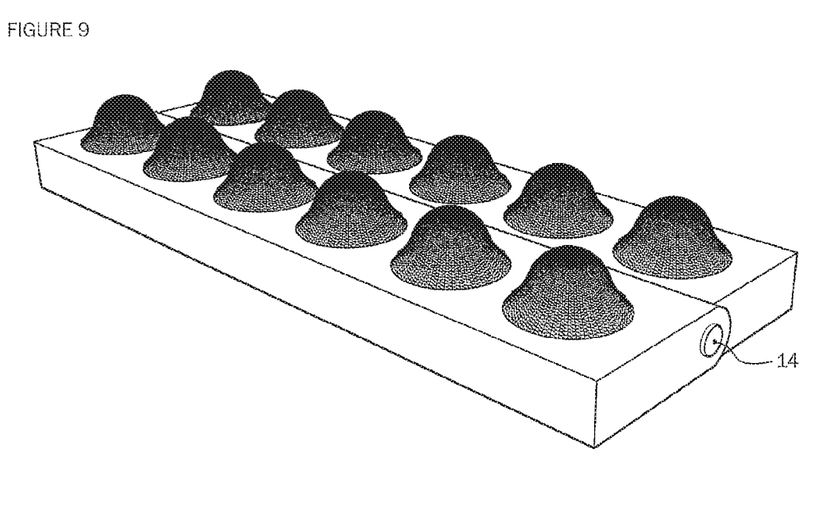
FIG. 9 shows the articulation on the mesh toolset of the apparatus.

The apparatus of the invention will now be described with reference to FIG. 6 which shows a perspective representation of the apparatus, and FIG. 7 which shows a schematic representation of the apparatus, and FIG. 9 which shows the articulation on the mesh toolset of the apparatus.

The current pulp thermoforming process is relatively slow, especially when compared to the existing processes used to produce either aluminium or plastic coffee pods or capsules, and requires one function to finish before another one can begin. The current process is typically stepped such that the formed or preformed pulp part is handed off to the second finishing tool and the mesh tool is lowered back into the tank to begin forming the next product.

To increase the volume of products manufactured, the machine sizes of current machines have been scaled up to allow for multiple products to be made during each stage. This has advantages in terms of flexibility as the machine can produce either fewer larger parts or more but smaller parts. Disadvantages are that the scale of the system requires higher volumes to be cost effective and this is exacerbated by the cost of tooling and the energy required to heat the system to enable it to dry the pulp parts.

Figure 8:
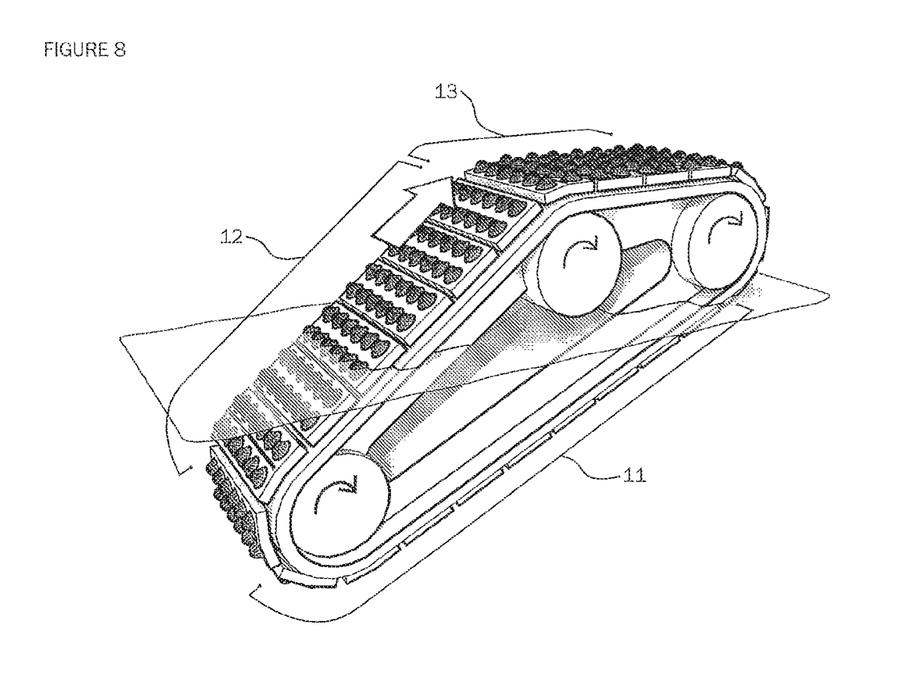
FIG. 8 shows the toolset belt and tank component of the apparatus.

It is therefore preferable to provide a process that overcomes the volume and line speed challenge. The current invention achieves this by creating a pulp forming process that is not staged, but a continuous feed and by creating a process that is developed to deliver a narrower range of products. This is shown in FIG. 6. To enable the fibre to be continuously formed, a contoured mesh belt is used where the contours make up the preformed capsule shape, with the belt comprising a plurality of articulated mesh toolsets which is continuously drawn through a tank of water and pulp fibres in suspension. This is shown in FIG. 8. The mesh belt is articulated and made up of a plurality of preformed metal mesh toolsets pivotally joined to make up the continuous belt. An articulated mesh toolset is shown in FIG. 9. The articulation point is shown as 9(14). The mesh belt is constantly moving and is angled such that the belt gradually rises out of the water and then lowers back into the tank. The belt is supported by a vacuum bed, which draws fibres continuously onto the areas of the belt that are under the water. This is shown in FIG. 8(11). Suction is maintained as the belt exits the water, to retain fibre on the mesh toolsets. This is shown in FIG. 8(12). Suction is turned off as the mesh toolsets enter the horizontal plane and prepare to hand off sections of pulp mat to the secondary toolsets. This is shown in FIG. 8(13). The articulated mesh toolset is contoured into a non-planar form to provide the male or female counterpart to the male or female conically formed pulp fibre part. The contouring of the mesh toolset is for the purpose of creating a pulp fibre coffee capsule or other products which are of a significant depth and draft angle that they could not be deformed from a flat pulp mat as detailed in patent application PCT/AU2013/000853 because of the limitations of material deformation. The draft angle is shown in FIG. 1C. The degree to which the mesh toolset conforms to the final capsule shape is determined by the specific pulp fibre's capacity to be deformed, the severity of the draft angle along which the pulp fibres are to be deformed, the final density of the vertical wall sections, the mechanical performance of the vertical wall sections and whether the pulp fibre part is to be decorated. The difference between the preform shape and the final capsule shape is shown in FIG. 4. The pulp fibre is drawn onto the contoured mesh and fibre is amassed. The amount of fibre amassed corresponds to the level of vacuum used and the belt speed. At this stage the pulp can also be coloured by dyes.

Sections of the mat which are clear of the water and have had further water removed by the vacuum are picked up by a moving tool set which lifts the section of pulp clear of the mesh toolset. This toolset is called the "Transfer Preform" toolset and is shown in FIG. 6(10). This tool set can be male or female in profile and engages with what will become the interior surface of the capsule. At this stage the shapes of both male and female toolsets are "pre-forms" that is to say not fully formed shapes, as defined earlier.

Should the part require decoration and that decoration needs to conform to the final contours of the capsule then the moving tool set presents the pulp section to the decoration station which would decorate the pulp as per the process detailed in U.S. Pat. No. 8,062,477 B2 which is incorporated herein by reference.

The Transfer Preform toolset then delivers the pre-formed pulp mat to the secondary tool set. The secondary toolset is shown in FIG. 6(9). The secondary toolset is shaped to reflect the final shape and dimensions of the pulp capsule. The secondary male or female toolset engages with the pulp mat and pressure and heat is applied to define the final dimensions and configuration of the part. The high level of moisture within the pulp fibre part allows the pulp fibres to be mobilised within the part and to slip under the pressure applied by the male or female tool, before the heat dries out the fibres and locks them in place. The moisture content within the part, the type of fibre, the position and shape of steam extraction vents and the addition of chemicals which increase slip, will define the mobility of the fibres.

In an alternative method, which allows for a faster line speed, there is a third or tertiary mouldset. In this alternative method, the secondary toolset only applies pressure, and forms the part into its finished shape, or a second pre-form that is closer to the finished part. The pulp mat is then passed to the tertiary mouldset where heat is applied, and where the part is dried. This method has the advantage of faster line speed, notwithstanding the extra station in the process, because each station only has one task. Fibres at the secondary toolset stage are able to slip and mould accurately into areas of variable density, because they are not subject to drying, whilst moulding, such that the correct amount of fibre is in place before final drying. The tertiary mould does not have to allow for slip and major reform, but can be engineered to optimise drying and steam extraction only. The tertiary mould can also be used to insert a barrier film, which can be formed from bio-polymer, to improve the oxygen barrier properties of the pulp. The barrier film would be physically supported by the pulp fibre part and therefore the film thickness would be limited to that required to provide the requisite barrier properties. Additionally the internal film could be utilised to act as a heat seal area for the pulp closure. Alternatively a finishing coating could also be applied here or by an additional process such as spray coating. The specific properties of film and or spray coating could be tailored to the product contained and are therefore readily customisable.

The section of dried pulp can then be moved off the moulding and forming line and can be trimmed and finished as desired.

Traditional methods of printing can also be applied at this stage. The capsules can now be further processed to allow for integration into the filling and sealing process.

Closure Bonding Process

The sealing closure can also be made from a fibre sheet with either a starch based contact adhesive or by use of a biopolymer film which allows the closure or cap to be bonded by use of a heat seal. The bond can be improved by designing the contacting surfaces to increase surface area and or to shape the sections such that the fibres also bond mechanically in the fashion of a crimped connection which could be formed as part of the moulding process. Additionally if a bioplastic is used as a barrier film within the capsule, said film can be used to bond the lid by use of a heat seal. The areas of the lid that are to be punctured need to be specifically considered to allow for crisp and precise puncture and the passage of hot water under pressure. In order to do this, these areas are identified, and smooth moulded on both their interior and exterior surfaces. Steam extraction vents are instead placed around the perimeter, and may be shaped into specific shapes to further facilitate this. This has the secondary benefit of creating a textured surface around the perimeter, which in turn provides a greater surface area for the application of one of the adhesive technologies previously referred to that bond the moulded pulp fibre lid to the moulded pulp fibre capsule. The pulp formed lids may be made using the existing known methods detailed in PCT/AU2013/000853.

When used in this specification and claims, the terms "comprises" and "comprising" and variations thereof mean that the specified features, steps or integers are included. The terms are not to be interpreted to exclude the presence of other features, steps or components.

The invention claimed is:

1. An apparatus for high speed continuous thermoforming of pulp materials into pulp-based products, the apparatus comprising:
    a holding tank for a suspension that includes water and pulp fibre,
    a continuous feed belt of articulated mesh toolsets contoured to a preform shape of said products, the preform shape being a partially shaped version of a final form shape of the pulp based products, said feed belt being inclined to allow partial immersion and partial withdrawal from said suspension by continuous rotation of said feed belt,
    vacuum means applied to said mesh toolsets to draw said pulp fibre onto said mesh toolsets immersed in said suspension to form a preform pulp mat of said products; and
    a second toolset to deform the pulp fibre mat from the preform shape to a final form shape of the pulp-based products by the application of pressure.

2. The apparatus according to claim 1, wherein said mesh toolset represents the female or male preform profile of said products.

3. The apparatus according to claim 2, further including a transfer tool set to lift sections of said preform pulp fibre mat from said mesh tool sets and to transfer the preform pulp mat to the second toolset.

4. The apparatus according to claim 3, wherein said transfer tool set is of a male or female profile of said product to engage with the preform profile of an interior or exterior of said product.

5. The apparatus according to claim 1, wherein the second toolset is configured such that the deformation of the pulp fibre mat from the preform shape to the final form shape by the second toolset involves at least one of:
    an increase in the draft angle of the final form shape compared with the preform shape,
    an increase in the depth of the final form shape compared with the preform shape, and
    a decrease in the wall thickness of the final form shape compared with the preform shape.

6. The apparatus according to claim 1, wherein the second toolset is shaped to reflect the final shape and dimensions of the pulp-based products.

7. The apparatus according to claim 1, wherein the second toolset is shaped to correspond with a second preform, and the apparatus further comprises a third toolset to apply pressure and/or heat to the second preform to form the pulp-based products.

* * * * *